United States Patent Office 3,446,630
Patented May 27, 1969

3,446,630
PROCESS FOR PRESERVING EDIBLES
John J. Beereboom, Old Lyme, Conn., assignor to Chas. Pfizer & Co., Inc., New York, N.Y., a corporation of Delaware
No Drawing. Filed Oct. 8, 1965, Ser. No. 494,233
Int. Cl. A23l 3/34
U.S. Cl. 99—150                                    7 Claims

ABSTRACT OF THE DISCLOSURE

Process for preserving foodstuffs, particularly processed foods, fresh vegetables, and fruits, by adding thereto small amounts of benzohydroxamic acid or one of its non-toxic salts. Preferably the preservative is applied in aqueous solution in an amount of about 0.01 to about 1.0% calculated as benzohydroxamic acid based on the weight of the foodstuff.

---

This invention relates to a process for the preservation of foodstuffs by the addition thereto of a small amount of benzohydroxamic acid. In particular, this invention relates to the preservation of fresh fruits and vegetables, and their juices, and to the preservation of processed foods such as dog food, cheeses and bakery goods such as bread, cookies, cakes by the addition of from about 0.01 to about 1.0 weight percent of benzohydroxamic acid or one of its non-toxic salts or mixtures thereof.

We have found that benzohydroxamic acid when added to various types and forms of foodstuffs preserves these foods from the growth of undesirable microorganisms. The preferred concentration is from about 0.01 to 1% based on the weight of foodstuff. Of course, higher levels are also effective but tend to superimpose the flavor of benzohydroxamic acid on the natural taste of the food. Also contemplated in the process of this invention are the non-toxic salts of benzohydroxamic acid which include the beryllium, magnesium, calcium, sodium, potassium, aluminum, zinc, iron, manganese, and ammonium salts. For convenience and economy, benzohydroxamic acid, its sodium and potassium salts are to be preferred. The acid and its salts or mixtures thereof may be added to the food as the dry material or more conveniently from a water or an organic solvent solution, for example, ethyl alcohol solution.

The foodstuffs contemplated as preferred in the process of this invention and which we have most successfully preserved by the addition of benzohydroxamic acid and its non-toxic salts are those which it is not economically feasible to freeze or to subject to cold storage and those foods whose flavor is lost on freezing. Examples of foods in the former category are dog food, cake mixes, apple cider and bakery products such as bread, cakes, cookies and pies. Foods whose flavor is lost or deteriorates on freezing and cold storage are fruit and vegetable juices, cheeses, fruit and vegetables and, in particular, sliced peaches and bananas. By the term processed foods is meant those foods which are mixed or treated in some manner prior to being sold. Such foods are, for example, cakes, pies, breads, dog foods, canned peaches and fruit juices.

An embodiment of this process as it applies to the preservation of fresh fruits including berries, and vegetables, comprises dipping said fruits, berries and vegetables in an aqueous solution of benzohydroxamic acid or one of its no-toxic salts. A solution of 1% benzohydroxamic acid or one of its salts has been found to be convenient for this purpose. The previously weighed foodstuff is re-weighed to determine the wet pick-up of solution and is then dried, either at room temperature or at a higher temperature, with the aid of a compressed air stream. Concentrations of from 0.1 to 1.0 weight percent of benzohydroxamic acid and its salts are effectively applied in this manner. The foods so treated can then be stored at room temperature, frozen or put in cold-storage areas. Another convenient method of applying these preservatives comprises spraying an aqueous solution of benzohydroxamic acid or one of its salts on the food. For convenience and economy, a 1% solution can be effectively applied to large batches of fruit or vegetables in open containers with a hand sprayer. Of course, a compressed air or an electric sprayer would also be useful. Where the application must be performed in the shortest possible time, a 10% aqueous solution of the sodium or potassium salt of the acid is most conveniently used. In this manner, a 0.5% treatment on the weight of foodstuff can be applied in a single spraying.

Benzohydroxamic acid and its non-toxic salts are most conveniently added to processed foods by simply mixing in a weighed amount of the acid or by dissolving the compound or its salt in water or ethanol and adding the solution to the food. For example, in mixing large commercial quantities of cake mix, the benzohydroxamic acid may be added to the shortening in any mixer of adequate size to ensure proper blending before the cake mix is prepared. In this manner, the benzohydroxamic acid is used to preserve the shortening in storage, the cake mix on the grocer's shelves and the final finished cake in the home or bakery.

An embodiment of the process of this invention as it relates to the preservation of fresh bananas comprises dissolving an amount of the sodium salt of benzohydroxamic acid in sufficient water to equal 0.01% of the weight of the bananas and spraying the solution on the bananas either as a hanging stalk or in bunches. The means of spraying the solution can be any type of rust-resistant commercial sprayer. An alternate procedure involves dipping 50 pound stalks or bananas in large tanks of an aqueous solution of benzohydroxamic acid in water. A more concentrated solution would, of course, be necessary since only a small volume of the solution is deposited on the bananas.

Another method which we have found effective in applying benzohydroxamic acid to edibles, comprises applying solutions of benzohydroxamic acid or one of its salts, such as the ammonium salt, to wrapping papers, paper cartons or carton liners used for storing food. For this type of application, the packing papers or paper cartons are weighed and dipped in a 10% aqueous solution of a salt of benzohydroxamic acid. The wet pick-up is determined and the paper is dried. The papers are then inserted into the cartons so as to give an effective concentration of benzohydroxamic acid based on the weight of the foodstuff. Similarly, the food may be placed in paper boxes treated with either benzohydroxamic acid or one of its salts.

The following examples are given by way of illustration and are not to be construed as limitations of this invention many variations of which are possible without departing from the scope and spirit thereof.

Example I.—Apple cider

To one liter of fresh unpasteurized apple cider was added sufficient dry benzohydroxamic acid to give a total of 0.1% by weight. The cider did not develop microbial growth after two weeks storage at room temperature of about 25° C. Untreated cider from the same pressing spoiled within three days when stored under the same conditions.

The experiment is repeated with the sodium and potassium salts of benzohydroxamic acid at levels of 0.1% by weight. After two weeks storage at room temperature (25° C.), no microbial growth develops.

Example II.—Prune juice

To one liter of fresh, unpasteurized prune juice was added sufficient dry benzohydroxamic acid to give a total of 0.05% by weight. The prune juice did not develop microbial growth after two weeks storage at about 25° C. An untreated control sample developed microbial growth within four days under the same storage conditions.

Example III.—Dog food

Samples of high moisture (20–25%) meat-type dog food, containing 0.1% benzohydroxamic acid added as a 50% ethanol solution, were inoculated with a mixed culture of yeast and fungi obtained from a sample of spoiled dog food, and stored at room temperature. No microbial growth developed in the samples after a 60-day storage period. Untreated control samples become moldy and spoiled within one week.

Example IV.—Fresh oranges

Oranges were inoculated by scratching the surfaces of the fruit and dipping in a suspension of *Penicillin digitatum* spores. The fruit was stored at room temperature (about 25° C.) for 24 hours and then dipped in a 0.5% aqueous solution of the potassium salt of benzohydroxamic acid for one minute. The oranges were stored in cardboard cartons at 20° C. for eleven days. Examination showed 76% less decay than inoculated control samples which were not treated with the benzohydroxamic acid and which were stored under the same conditions.

Example V.—Chocolate cake

A chocolate cake batter was prepared by combining 187 grams of cake flour, 303 grams sugar, 70 grams melted chocolate, 4 grams baking powder, 4 grams baking soda, 4 grams salt, 100 grams shortening, 245 grams whole milk, 2 grams vanilla extract and 96 grams of whole egg. To the mixed batter, weighing 1015 grams, was added 0.102 gram or 0.01 wt. percent benzohydroxamic acid. The batter was re-mixed for 3 minutes and baked at 350° F. for 30 minutes. After storage at room temperature (25° C.) for 17 days the treated cake showed no mold growth. An untreated cake prepared from the same batter without the addition of benzohydroxamic acid, showed mold growth after 9 days storage at room temperature.

The same batter was prepared and divided into 8 parts. To individual batter samples were added 0.1 gram of the sodium salt of benzohydroxamic acid, the potassium salt, the calcium salt, the manganese salt, the ferrous salt, the zinc salt and the aluminum salt of benzohydroxamic acid so that each batter sample contained 0.01 wt. percent of a different salt. After re-mixing and baking, the samples were stored at room temperature for 17 days. The treated cakes showed no mold while an untreated cake sample showed mold growth after 9 days storage at room temperature.

Example VI.—Devil's food cake

To a cake batter prepared by mixing 13.6 grams chocolate, 136.2 grams shortening, 6.81 grams Atmul 500 [1], 1009 grams cake flour, 1090 grams sugar, 123 grams non-fat milk solids, 20.4 grams salt and 123 grams cocoa was added 1.2 grams or 0.1% benzohydroxamic acid. The batter was re-mixed for three minutes and baked at 365° F. for 26 minutes. The cake was exposed to the air for one hour, wrapped in a plastic bag and stored at room temperature. After 20 days storage, the cake was free of mold growth. An untreated cake prepared from the same batter but without the benzohydroxamic acid developed mold growth within 6 days.

Example VII.—Cheese

To samples of melted American cheese were added sufficient benzohydroxamic acid to give 0.05% based on the weight of the cheese. The melted cheese was inoculated with *Penicillium digitatum* spores and did not develop mold on storage for 20 days at room temperature. Inoculated, untreated control samples developed mold after 3 days storage at room temperature.

On one-pound wedges of Muenster cheese was sprayed a 5% aqueous solution of the ammonium salt of benzohydroxamic acid. The samples were stored at room temperature for 20 days and did not develop mold growth. Untreated slices developed mold growth within 5 days when stored at room temperature.

What is claimed is:

1. A process for preserving foodstuffs which comprises adding thereto a small amount of benzohydroxamic acid in the form of the acid itself or one of its non-toxic salts or mixtures thereof, in an amount sufficient to preserve the foodstuff.

2. A process according to claim 1 wherein the benzohydroxamic acid is applied in aqueous solution.

3. A process according to claim 1 wherein the benzohydroxamic acid or one of its non-toxic salts or mixtures thereof is in the range of from about 0.01 to about 1% calculated as benzohydroxamic acid based on the weight of said foodstuff.

4. A process according to claim 1 wherein said foodstuff is a processed food.

5. A process according to claim 1 wherein said foodstuff is cheese.

6. A process according to claim 1 wherein said foodstuff is a fresh vegetable.

7. A process according to claim 1 wherein said foodstuff is a fresh fruit.

References Cited

FOREIGN PATENTS 660,891   3/1965   Belgium.

OTHER REFERENCES

CA 62: 5822c, March 1965.
CA 59: 5573g, March-April 1959.

A. LOUIS MONACELL, *Primary Examiner.*

J. M. HUNTER, *Assistant Examiner.*

U.S. Cl. X.R.

99—154, 162

---

[1] Atmul 500, trademark of Atlas Powder Co. for a monoglyceride-diglyceride emulsifier.